March 29, 1966   I. J. GARY   3,242,660
CUTTER BLADE AND SCREEN FOR LAWN MOWER MULCHING ATTACHMENT
Filed April 7, 1964   2 Sheets-Sheet 1

Ira J. Gary
INVENTOR.

BY *Lawrence A. O'Brien*
*and Harvey B. Jacobson*
Attorneys

March 29, 1966     I. J. GARY     3,242,660

CUTTER BLADE AND SCREEN FOR LAWN MOWER MULCHING ATTACHMENT

Filed April 7, 1964     2 Sheets-Sheet 2

Ira J. Gary
INVENTOR.

BY *Clarence A. O'Brien*
*and Harvey B. Jacobson*
                Attorneys

United States Patent Office 3,242,660
Patented Mar. 29, 1966

3,242,660
CUTTER BLADE AND SCREEN FOR LAWN
MOWER MULCHING ATTACHMENT
Ira J. Gary, 535 Aero Drive, Shreveport, La.
Filed Apr. 7, 1964, Ser. No. 358,040
2 Claims. (Cl. 56—25.4)

This invention comprises a novel and useful cutter blade and screen for lawn mower mulching attachments and more particularly pertains to a mulching device comprising an attachment which may be readily secured to or removed from a conventional lawn mower of a rotary blade type to convert such lawn mower from its normal cutting operation into a highly efficient mulching apparatus for vegetation lying upon the ground.

This invention comprises an improvement over the invention disclosed in my prior U.S. Patent No. 3,134,212, dated May 26, 1964, for Leaf and Pine Straw Mulching Lawn Mower Attachment and comprises certain improvements thereover.

In my prior patent there is disclosed and claimed a mulching attachment for lawns and the like which consists of a mulching screen and a mulching blade adapted to be applied to a conventional rotary blade type of lawn mower for converting the latter into an implement that is highly efficient for the comminuting and mulching of leaves, grass, straw, pine needles and the like.

It has been found, however, that the apparatus of my prior copending application encountered considerable difficulty when employed on lawns having a heavy coating of leaves thereon, and due to the large quantity of leaves on a given area of the lawn, the leaves were packed between the rotating mulching blade and the mulching screen in such an extent that they often stalled the motor. Consequently, it was necessary for the mulching device to progress very slowly over the lawn when the latter was covered by a relatively thick layer of leaves.

It is therefore the primary purpose of this invention to provide a mulching device which although conforming in principle to that of my prior copending application, is capable of mulching leaves and vegetation at a much greater rate and shall be substantially free from the danger of stalling the motor due to a congestion of the leaves and vegetation being mulched.

A further object of the invention is to provide a device in accordance with the preceding object which shall very effectively shred, comminute and mulch leaves and other vegetation even when they form a relatively thick layer on the ground over which the device passes.

Still another purpose of the invention is to provide a mulching device in accordance with the preceding objects wherein the end of the mulching blade and the adjacent surface of the mulching screen shall have cooperating elements complementing each other in the shredding, comminuting and mulching of leaves and other vegetation pressed and compacted therebetween.

Specifically, it is an object of this invention to provide a mulching attachment for the rotary blade type of lawn mowers and particularly of the type set forth in my above-identified prior copending application and which shall greatly increase the effectiveness of mulching and the dependability of the operation thereof even when employed in environments having an unusually heavy layer or coating of vegetation and leaves thereon.

More specifically, it is an object of this invention to provide a mulching attachment for lawn mowers of the rotary blade type wherein the mulching blade applied to the lawn mower as a replacement for the cutter blade thereof shall not only produce an effective suction for lifting the leaves and other vegetation into the mulching chamber of the device but will also effectively shred, comminute and mulch such vegetation as it tends to collect by centrifugal force between the mulching blade and the mulching screen.

A further specific object of the invention is to provide a device in accordance with the preceding objects wherein a mulching screen shall include a plurality of appropriately spaced radially inwardly extending projections which will prevent direct engagement of the leaves and other vegetation with the screen itself which would clog the flow of air therethrough and will hold the vegetation at a slight distance from the screen during the shredding and mulching of the vegetation by the mulching blade.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
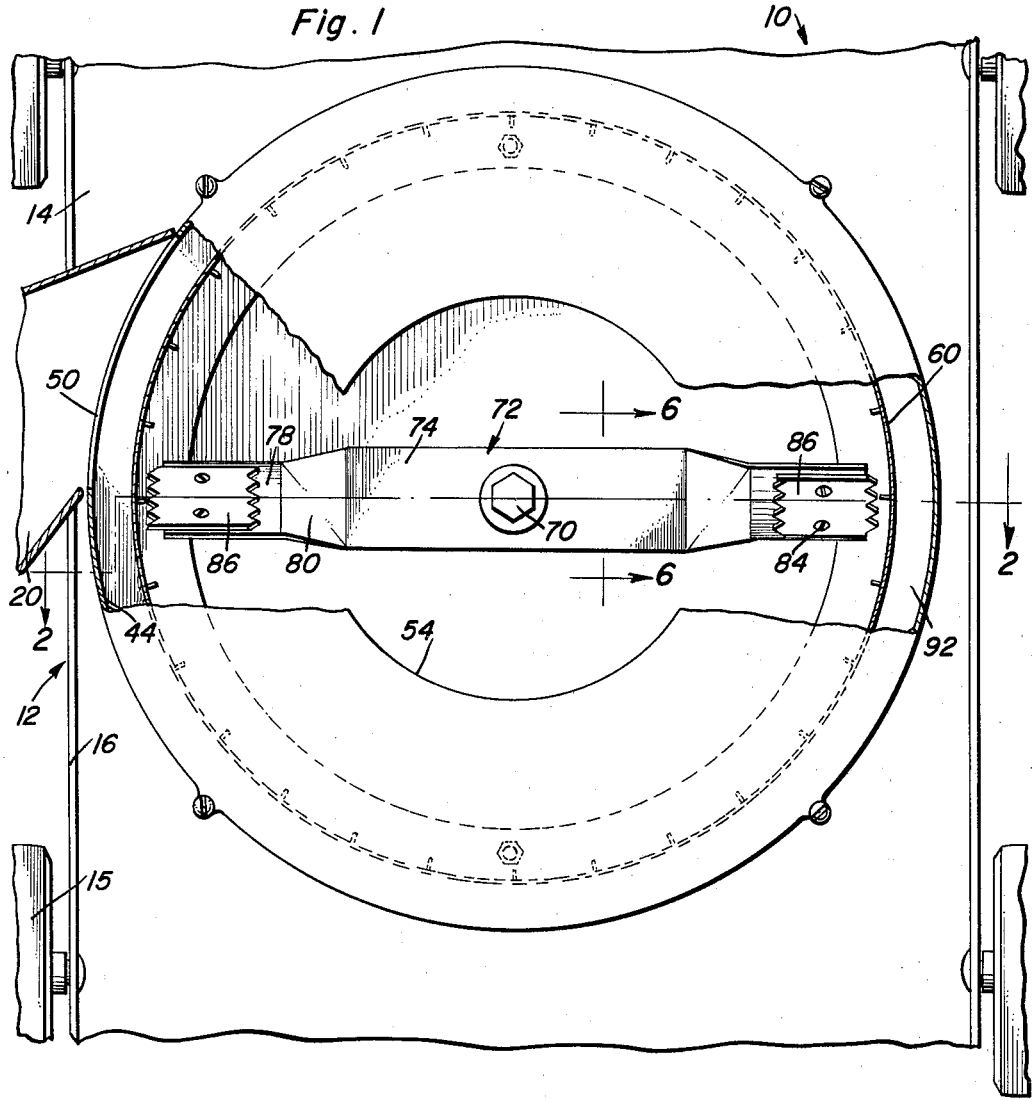
FIGURE 1 is a fragmentary bottom plan view of the lawn mower showing the mulching screen and mulching blade of this invention applied thereto, parts being broken away and shown in horizontal section.
Figure 6:
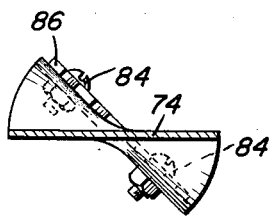
FIGURE 6 is a detailed view in vertical transverse section through the mulching blade taken substantially upon the plane indicated by section line 6—6 of FIGURE 1.

It is frequently desirable and extremely beneficial to thoroughly comminute or mulch grass cuttings or other vegetation and return this material in the form of a very fine mulch to the lawn. While attachments have been provided heretofore for lawn mowers of the rotary blade type for carrying out this purpose, they usually leave much to be desired in the efficiency of their mulching action and in the degree of fineness in their comminution of vegetation. This failure to attain their full objectives frequently arises from the inefficiency of the usual mowing blade as a mulching blade, lack of adequate suction and force draft of vegetation conveying air to the mulching device, and the loss of such air velocity through leakage between the mulching blade, mulching baffle or screen and the housing of the lawn mower.

It is therefore the primary purpose of this invention to provide a device which will be readily applied as an attachment to conventional lawn mowers of different characters, but of the rotary blade type, and which will attain a greatly increased efficiency of mulching operation through the provision of a special blade particularly designed for effective operation as a mulching blade, a novel and greatly improved mulching screen extending throughout the entire path of travel of the mulching blade and enclosing it, a mulch collecting channel with the discharge directly into the customary lateral housing outlet of the lawn mower, together with a sealing means by which a standard type of mulching attachment may be efficiently mounted on the underside of the top walls of lawn mower housings having different shapes and configurations, and thus will obtain a perfect fluid tight fit therebetween preventing the escape of air. A further very important adjunct of the invention resides in so controlling through the construction of the mulching attachment the draft or in flow of air carrying vegetation from the ground into the mulching blade and into the interior of the mulching attachment for realizing a greatly increased efficiency of operation.

Still further, a very important feature and characteristic of the invention is the provision of a novel construction of cooperating mulching screen and mulching blade which will effectively preclude the compacting of leaves and other vegetation between the blade and screen in such quantities as to throttle or shut-off the flow of air through the screen itself when the device is employed in areas having a great accumulation of leaves and other vegetation upon the lawn.

In the accompanying drawings there is disclosed the same general arrangement of a conventional type of lawn mower to which there is applied a mulching screen assembly with a mounting therefore and a mulching blade in the manner set forth in my prior copending application. However, the mulching screen itself is of an improved construction as is the mulching blade to obtain a novel effective coaction between these elements in the assembly.

In the accompanying drawings, it will be observed that the numeral 10 indicates any conventional power operated lawn mower of the rotary blade type having the customary carriage including a housing 12 having a top wall 14 and which housing is mounted upon conventional supporting wheels as at 15. The housing 12 has an open bottom and the generally flat top wall 14 has a peripheral depending skirt 16 which however is provided with a laterally extending outlet or discharge opening 20, located at any convenient portion of the side walls of the housing and by means of which the cuttings of the lawn mower blade are customarily ejected to one side of the lawn mower. In the present invention, use is made of this discharge opening for the purpose of discharging the mulchings produced by this device.

The conventional lawn mower 10 further includes any suitable power plant such as that diagrammatically indicated by the casing or housing 22 and which is detachably secured as by means of its flanged lower end 24 and fastening bolts 26 to the top wall 14 of the housing. The power plant includes a drive shaft 28 which extends from the power plant downwardly through a central opening 30 in the top wall 14 and into the chamber on the underside of the housing, where the shaft is provided with any conventional type of mowing blade, not shown. Various types of conventional lawn mowers usually have their top walls 14 of different contours or configurations and seldom are in the form of true planar surfaces. When the top wall 14 is of a non-planar configuration, it is usually difficult to effect a tight seal between the mulching attachment and the underside of such top wall. As set forth in my above prior patent and illustrated in FIGURES 2 and 3 of the drawings thereof, an adapter plate was employed. However, where the top wall 14 has a planar undersurface, no such adapter plate is needed and consequently the mulching attachment of the instant invention is secured directly to the underside of the top wall, see FIGURE 2.

The mulching attachment of this invention consists of a generally cylindrical or drum-shaped member indicated generally by the numeral 40 together with a mulching screen disposed therewithin and designated generally by the numeral 42. The outer member 40 comprises a cylindrical vertically extending side wall 44 having a flat horizontal closure will 46 at its upper end provided with a central opening 48 for passage of the shaft 28 therethrough.

The wall 44 is provided as shown in FIGURE 1 with an opening 50 which registers with the discharge spout 20 of the lawn mower housing. At its lower edge, the cylindrical wall 44 is provided with an annular radially inwardly extending flange or bottom wall 52 which is disposed in parallel relation to the top wall 46 of the mulching attachment and is provided with a central opening 54 therethrough through which air is drawn by the mulching blade and vegetation, leaves and the like are drawn to the device to be comminuted in a manner to be subsequently set forth.

Fastening bolts such as indicated at 56 are employed to detachably secure the mulching attachment 40 to the underside of the lawn mower housing top wall 14 and also to secure the mulching screen 42 therewithin.

The mulching screen 42 comprises a cylindrical member 60 having an annular radially inwardly extending mounting flange 62 at is upper end. This flange is provided with apertures 64 thereon through which the fastening bolts 56 previously mentioned are to be inserted for detachably securing the mulching screen to the interior of the mulching device 40 and with the latter to the underside of the housing top wall 14 of the lawn mower and within the housing chamber of the lawn mower. It will be noted that the lower surfaces of the lawn mower housing skirt 16 and of the flange 52 of the mulching attachment are coplanar.

As in my prior U.S. Patent No. 3,134,212, the mulching screen 42 is provided with a large number of evenly distributed openings or bores 66 therethrough about the entire 360 degree circumference of this screen. These bores or passages serve to comminute the vegetation of very small particles as it is forced therethrough under the action of the mulching blade. However, in addition to the openings 66, the mulching screen includes a plurality of inwardly projecting lugs for elements each indicated by the numeral 68. Conveniently, these elements may comprise lugs or tabs which are laterally struck inwardly from the cylindrical member 60 at circumferentially spaced intervals thereabout. For example, the lugs 68 may be provided in vertical rows and may be spaced about two inches circumferentially about the member 60 between adjacent rows of openings 66. The lugs extend a slight distance inwardly from the member 60 so as to engage and support vegetation moved centrifugally toward the screen and to prevent such vegetation from directly contacting the member 60 and the openings 66 therein whereby to close the opening and prevent the outflow of air which would thus completely stop all action of the mulching device.

Figure 5:
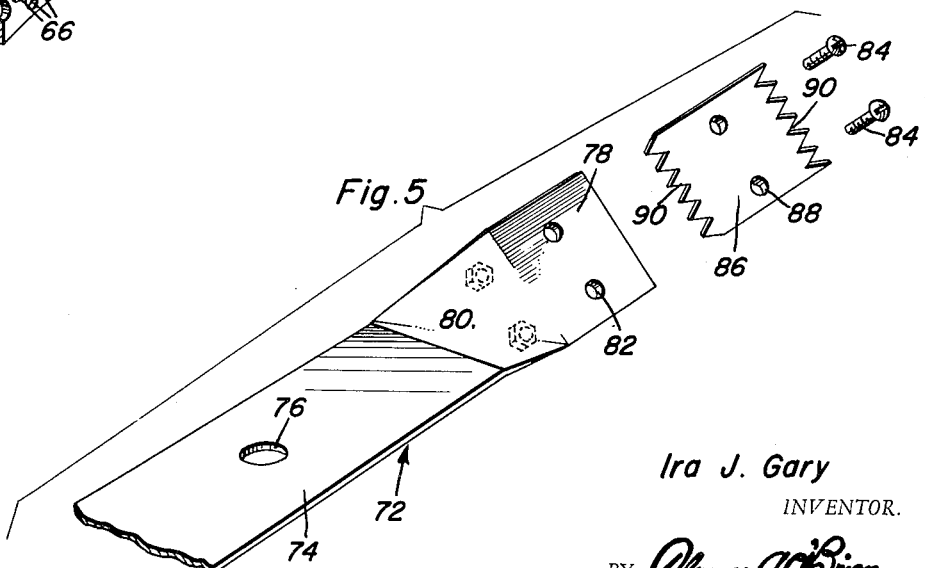
FIGURE 5 is a fragmentary exploded perspective view of a portion of the end of the mulching blade showing the removable serrated tips or cutters thereon.

In place of a conventional lawn mower blade, not shown, there is applied and secured to the end of the drive shaft 28 by the usual clamping bolt 70 thereon a mulching blade designated generally by the numeral 72. As will be observed particularly from FIGURE 5, the mulching blade comprises a flat blade-like central portion 74 apertured as at 76 for the reception of the fastening bolt 70 therethrough, and with a portion 74 being disposed in a plane which is perpendicular to that of the shaft 28 or in a horizontal plane.

Figure 4:
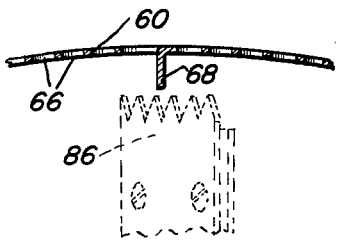
FIGURE 4 is a further detailed view in horizontal section taken substantially upon the plane indicated by section line 4—4 of FIGURE 3 and showing in dotted lines the association of the serrated end of the mulching blade with respect to the inward projection of the mulching screen.

The end portions of the blades 74 are provided with flat angulated sections each indicated by the numeral 78 and which are disposed each in a plane at about 45° to the plane of the central portion 74 but at reverse angles with respect thereto. Inclined portions 80 serve to integrally unite the terminal portion 78 over the central portion 74. Openings 82 are provided in the portion 78 for reception of fasteners such as the screws 84 by means of which replaceable serrated mulching elements 86 which are apertured as at 88 are detachably secured to the portions 78. Both ends of the elements 86 are serrated as at 90 to thus provide two sets of knife-edge serrated surfaces which may be selectively employed and which project beyond the extremities 78 of the mulching blade in order to cooperate with the projecting element 68 as shown in FIGURE 4 for shredding, comminuting or mulching vegetation or other material which may be disposed between the blade and the projections.

It will be observed that the end portions of the blade 72 lie above the flange 52. Further, except for the central inlet 54 and the perforations in the mulching screen 42, the chamber in which the mulching blade is received is air tight. Consequently, upon rotation of the blade 72, air is drawn upwardly from below through the opening 54, by the rotation of the blade and its terminal portions disposed at 45° angles to the plane of rotation of the blade, and is then discharged centrifugally radially outwardly through the screen 42 and into the annular mulch collecting chamber lying between the screen and the wall 44. From the latter, the air with the mulched material is discharged through the opening 50 and discharge spout 20 to the exterior of the lawn mower housing 12.

The openings are of such size as to produce a very fine comminuting or pulverizing action upon leaves, fine straw or other vegetation forced outwardly therethrough whereby to produce a very fine mulch.

Figure 2:
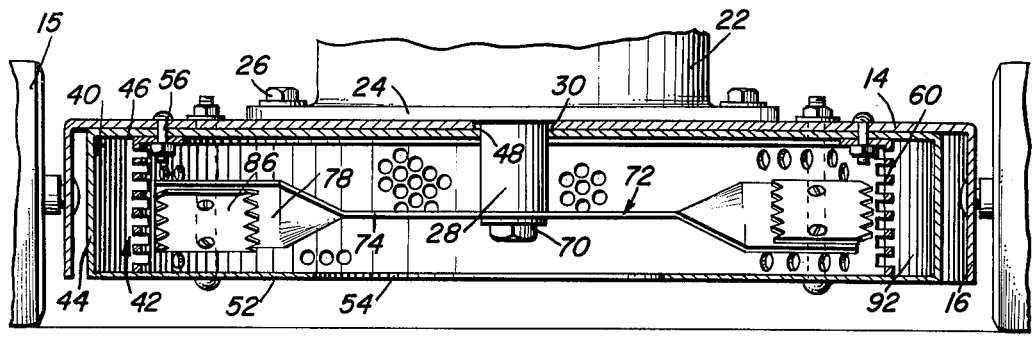
FIGURE 2 is a view in vertical transverse section taken substantially upon the plane indicated by the section line 2—2 of FIGURE 1 and showing in particular the underside or mulching chamber of the lawn mower, the position of the mulching screen therein and the mulch collection chamber of the device together with a structure of the mulching blade.
Figure 3:
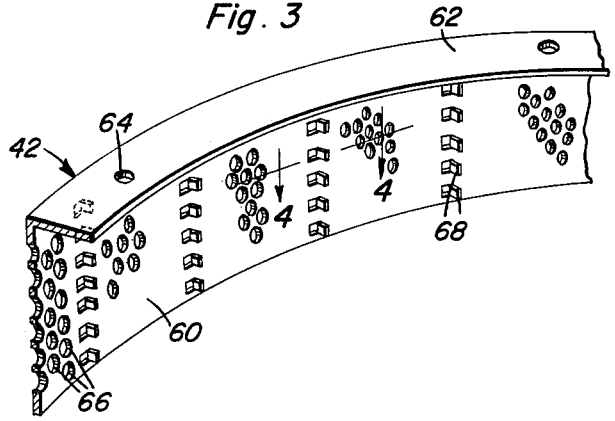
FIGURE 3 is a fragmentary perspective view of a portion of a mulching screen of this invention showing the radially inwardly extending projections thereof.

It will be noted that the serrated edges 90 of the mulching blade member 86 lie in a plane which is inclined at 45° to a horizontal plane of rotation of the blade. Consequently, these serrations will pass in very close relation to the member 60 and its inwardly extending projections 68 as shown in FIGURES 2 and 4 and thus will scrape, shred, comminute and pulverize leaves or other vegetation tending to collect between the member 60 and the blade.

The mulching blade is enclosed in a chamber lying between the bottom flanges 52 and the top wall 46, and is surrounded by the member 60, and the mulching attachment wall 44 as well as the four housing walls 16 to thus support the maximum protection to the user.

It will be further observed that the device can be readily applied or readily removed from conventional types of lawn mowers, it being merely necessary to move the conventional lawn mower blade upon the completion of a mowing operation to apply this attachment and the mulching blade in order that a very efficient mulching operation may be performed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a rotary power lawn mower of the type including a housing having a generally horizontal top wall with a peripheral skirt depending therefrom and defining therewith a downwardly opening mowing chamber, said skirt including a lateral outlet for the discharge of grass cuttings from said mowing chamber, said housing having a power source mounted thereon and including a depending rotatable power shaft projecting downwardly through said top wall into said chamber, a blade mounted on said shaft for rotation therewith and disposed within said chamber, a mulcher comprising an upstanding drum-shaped member disposed entirely within said chamber and including upstanding generally cylindrical side walls, a generally horizontal top wall extending between the upper edge portions of said sidewalls and having an opening therein down through which said shaft projects, an annular inwardly projecting bottom wall secured between the lower edge portions of said side walls, fastening means removably securing the second mentioned top wall to the undersurface of said first-mentioned top wall, said cylindrical side wall having an opening formed therein registered with said lateral outlet, a drum-shaped mulching screen concentrically disposed within said drum-shaped member and including upstanding generally cylindrical side walls of a diameter greater than the inner diameter of the bottom wall and smaller than the diameter of the first-mentioned cylindrical side walls, said mulching screen including an annular top wall through which said fasteners are also secured to fasten said annular top wall to the undersurface of the second-mentioned top wall, the last-mentioned side wall extending the full distance between said second-mentioned top wall and said annular bottom wall and being abutted against the latter, the last-mentioned side wall including a plurality of openings formed therein and spaced circumferentially thereabout and having a plurality of circumferentially spaced portions thereof laterally struck inwardly therefrom defining inwardly projecting lugs, at least some of said openings being formed by the inward displacement of the free end of said lugs, said blade being elongated and including opposite end portions which are inclined relative to the plane in which said blade is rotatable, said end portions including internal ends disposed for swinging in close proximity to the inner ends of said legs upon rotation of said shaft.

2. The combination of claim 1 wherein said terminal ends comprise reversible double ended serrated plate-like members removably secured to the opposite ends of said blades.

References Cited by the Examiner

UNITED STATES PATENTS

| | | | |
|---|---|---|---|
| 2,669,078 | 2/1954 | Gregory | 56—501 |
| 2,737,003 | 3/1956 | Beers | 56—25.4 X |
| 2,924,058 | 2/1960 | Brooks | 56—295 |
| 3,134,212 | 5/1964 | Gary | 56—25.4 |

ANTONIO F. GUIDA, *Acting Primary Examiner.*